United States Patent [19]

Perry

[11] Patent Number: 4,531,210
[45] Date of Patent: Jul. 23, 1985

[54] DIGITAL SPAN REFRAMING CIRCUIT
[75] Inventor: Thomas J. Perry, Phoenix, Ariz.
[73] Assignee: GTE Automatic Electric Incorporated, Northlake, Ill.
[21] Appl. No.: 506,758
[22] Filed: Jun. 22, 1983
[51] Int. Cl.³ .............................................. H04T 3/06
[52] U.S. Cl. .................................................... 370/100
[58] Field of Search ........................ 370/100; 375/114

[56] References Cited

U.S. PATENT DOCUMENTS

| | | | |
|---|---|---|---|
| 4,121,057 | 10/1978 | Luder | 370/100 |
| 4,124,778 | 11/1978 | Amass | 370/100 |
| 4,164,629 | 7/1979 | Ollivier et al. | 370/100 |
| 4,213,011 | 7/1980 | Hoelzl et al. | 370/100 |
| 4,225,960 | 9/1980 | Masters | 375/114 |
| 4,247,936 | 1/1981 | Hushy | 370/100 |
| 4,276,642 | 6/1981 | Siglow et al. | 370/100 |
| 4,340,962 | 7/1982 | Wintzer et al. | 370/100 |
| 4,344,180 | 8/1982 | Cummiskey | 370/100 |
| 4,357,701 | 11/1982 | Canniff | 370/100 |
| 4,368,531 | 1/1983 | Chopping | 370/100 |
| 4,402,080 | 8/1983 | Mueller | 370/100 |
| 4,434,498 | 2/1984 | Mathieu | 375/114 |
| 4,450,558 | 5/1984 | Hampton et al. | 375/114 |

Primary Examiner—Douglas W. Olms
Assistant Examiner—Curtis Kuntz
Attorney, Agent, or Firm—Frank J. Bogacz; Peter Xiarhos

[57] ABSTRACT

In a telecommunications switching system, which has a switching network connected to a number of asynchronous digital spans, a digital span reframing circuit continuously reframes and resynchronizes each of the digital spans that are detected as lacking proper framing. The digital span reframing circuit realigns both framing and super framing, TS bits and FS bits, for proper digital span reception.

7 Claims, 10 Drawing Figures

FRAME DETECTOR STATES

TI DATA FORMAT

FRAME DETECTOR STATES

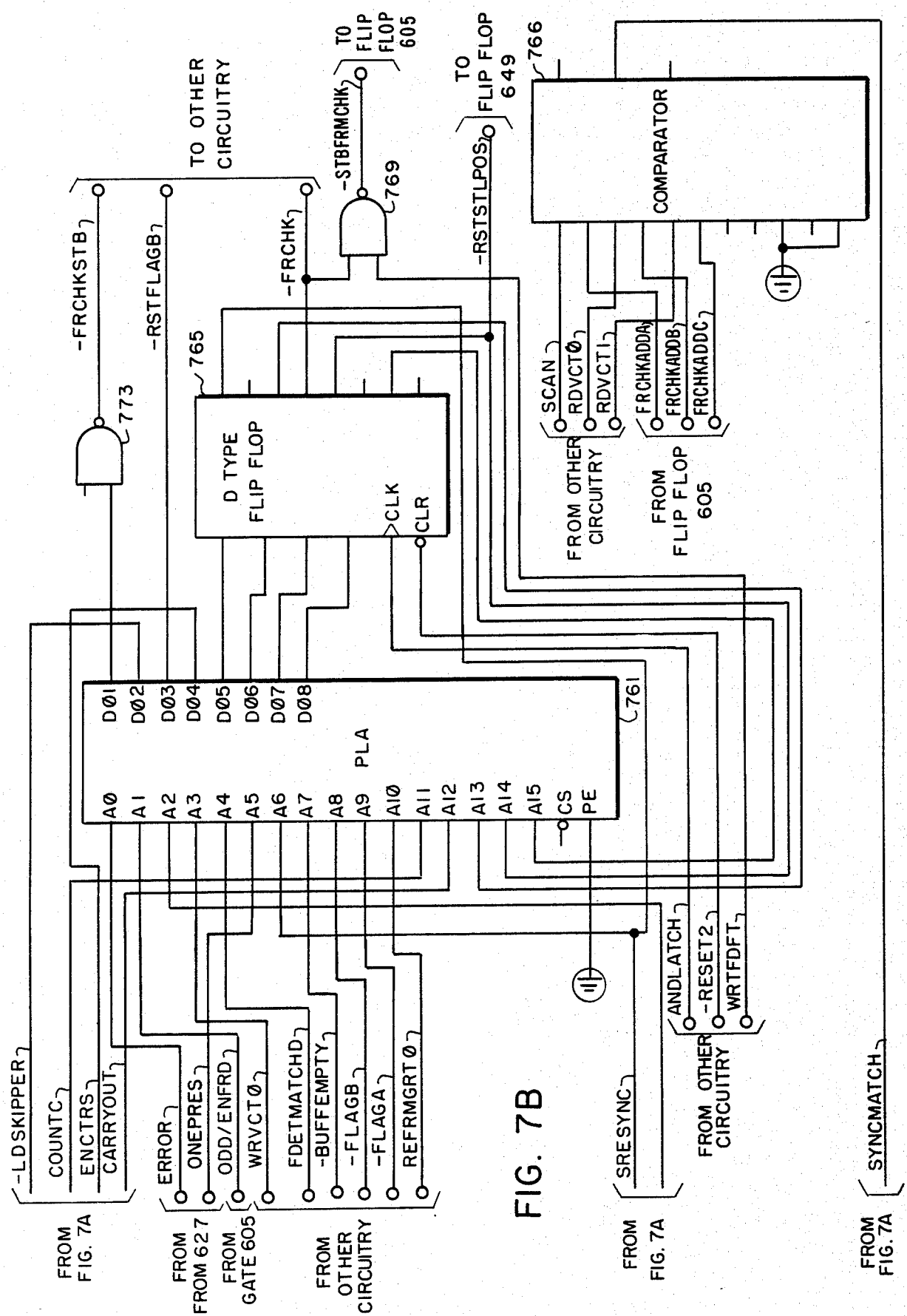

DIGITAL SPAN REFRAMING CIRCUIT

CROSS-REFERENCE TO RELATED APPLICATIONS

The present application is related to copending U.S. patent application Ser. No. 83-4-069, having the same inventive entity and being assigned to the same assignee.

BACKGROUND OF THE INVENTION

The present invention pertains to data transmission between telecommunications switching systems via digital spans and more particularly to a circuit within a telecommunications switching system for reframing and resynchronizing a number of digital spans.

In modern telecommunications switching, it is necessary to transmit large amounts of data rapidly between switching systems. To this end, digital spans are utilized to connect switching systems and to transmit this data. These digital spans may be T1 or T2 carriers using DS1 or DS2 data formats, respectively. These digital spans transmit data at high speeds, serially. The data is transmitted by one switching system and received by another. Since a particular switching system may be connected to a number of others, each switching system may have a number of digital spans from which it receives data.

These digital spans contain framing and synchronizing information. Since high frequency signals are subject to drifting, periodically the digital spans may lose proper framing and synchronization. This problem is magnified when a switching system must maintain proper framing and synchronization for a number of digital spans.

In addition, the Federal Communications Commission provides regulations which mandate the duration that a digital span may be without proper framing and synchronization.

Accordingly, it is the object of the present invention to provide an efficient and quick operating circuit for digital span reframing and resynchronization.

SUMMARY OF THE INVENTION

In a telecommunications switching system, which has a switching network, a plurality of digital spans are connected to the switching network. Each of the digital spans asynchronously transmits PCM data to the switching network. A digital span reframing circuit is connected between each of the digital spans and the switching network for reframing and resynchronizing any of the digital spans that indicate a lack of proper framing and synchronization. A reframe status indicator is provided which indicates which of the digital spans requires reframing and resynchronization.

The digital span reframing circuit includes a memory which is connected to each of the digital spans and operates in response to the reframe status of a digital span which indicates reframing is necessary. The memory cyclically stores a predefined amount of PCM data and stores still possible bit indications for each of the PCM data as a possible synchronization bit.

A comparator examines still possible bits with received PCM data. The comparator is connected to the memory and operates to generate a reset bit for the equality of the still possible bits with the received PCM data or alternatively, to generate a set bit for each inequality of the PCM data with the still possible bits. The memory then stores these generated set and reset bits as new still possible bits.

A sequencer is connected to the memory, to the particular digital span and to the comparator. The sequencer operates cyclically to drive the memory and the comparator over a predetermined time interval.

A detector is connected to the memory and to the sequencer. The detector operates in response to the new still possible bits to generate a one present signal for a set still possible bit. The detector also operates to generate a plurality of signals which represent the position of the set still possible bit within the PCM data.

A generator is connected to the detector and to the sequencer. The generator operates in response to the position signals to produce a new write vector signal which represents a pointer to the initial PCM data of the first frame of data.

DESCRIPTION OF THE DRAWINGS

FIGS. 7A and 7B are schematic diagrams of a portion of digital span frame detection and reframing circuitry.

DESCRIPTION OF THE PREFERRED EMBODIMENT

Figure 1:
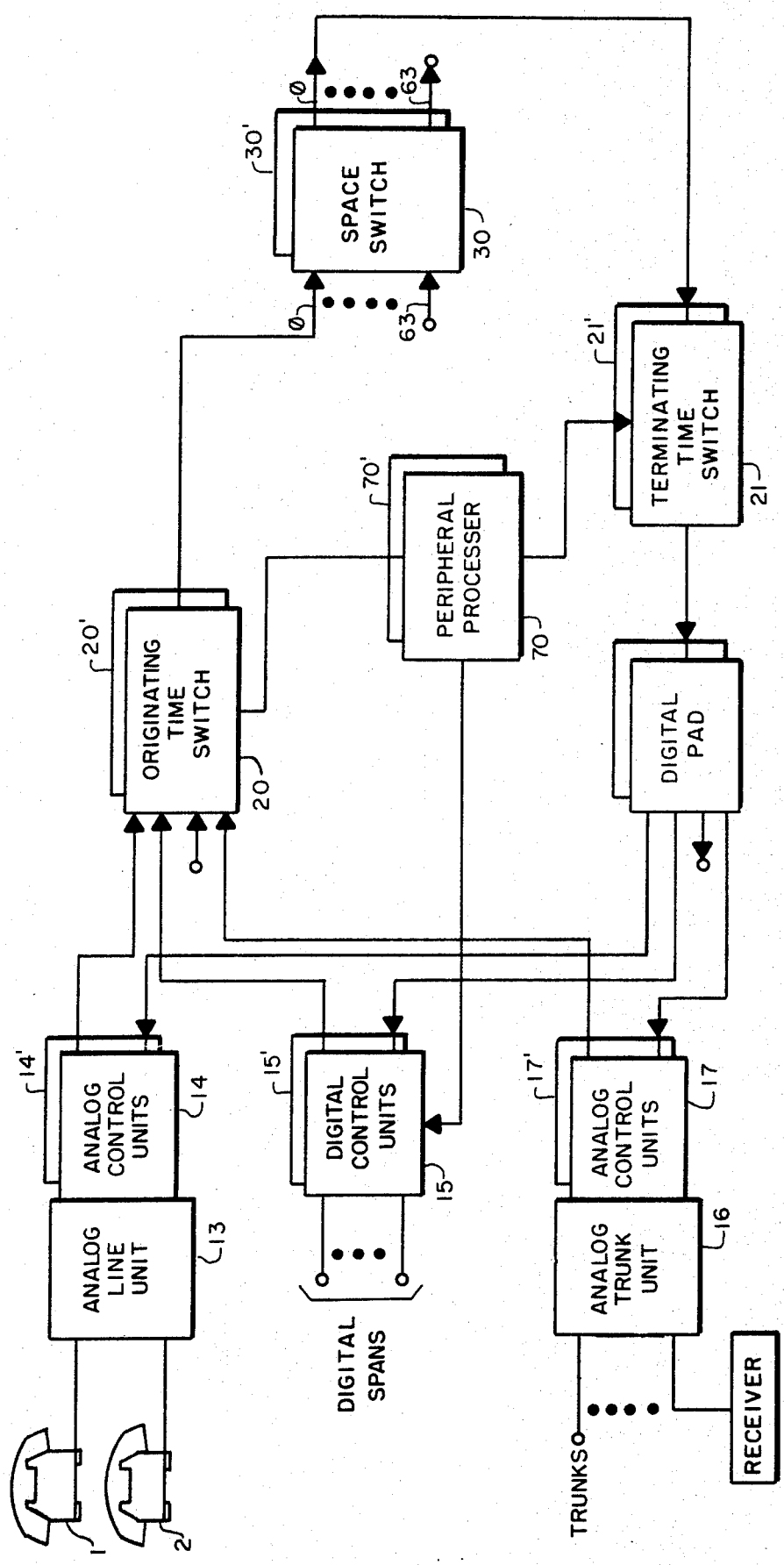
FIG. 1 is a block diagram of a telecommunications switching system which embodies the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using a model 9004 T1 digital span manufactured by GTE Lenkurt Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Figure 2:
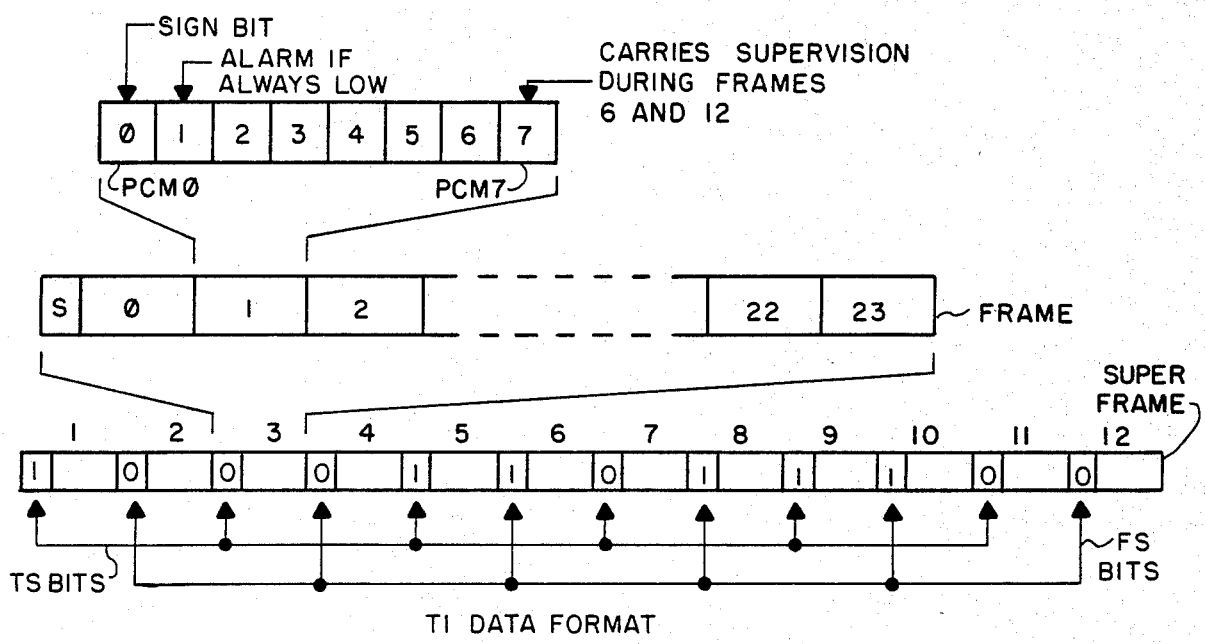
FIG. 2 is a bit map of a channel, a frame, and a super frame of a T1 digital span.

The nature of a T1 data and its format is shown in FIG. 2. Each voice sample consists of eight bits, PCM0–PCM7. PCM0 is a sign bit. PCM1–PCM7 give the magnitude of the voice sample. PCM1 may also be used to convey alarm indications. PCM7 is used to carry supervision information during frames 6 and 12.

Twenty-four voice samples are organized together with an S bit to form a frame. Each voice sample in the frame is associated with one channel of voice (or data). The channels are numbered 0–23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Every time a TS bit occurs, a frame detector compares it with the value that it expects to see (ones during frames 1, 5, and 9; zeroes during frames 3, 7, and 11). If the TS bit disagrees with the expected value, it is considered an error. If three errors occur during any five consecutive examinations of TS bits for a digital span (T-carrier), then that digital span is considered to be out of frame. An alarm condition is operated. Eventually, an attempt will be made to reframe that T-carrier.

Examination of FS bits is an analogous procedure to that of the TS bits, except for the fact that no check is made for FS bits occuring during frames 2 and 8.

When reframing is attempted for a digital span, the frame detector examines each bit position for a period of 16 frames. If any bit position has consistently toggled during alternate frames, then that bit position is assumed to be the correct framing bit position, and the contents of a write vector will be updated to reflect the new S bit position.

If the TS pattern is properly aligned, but the FS pattern is in error, the frame detector will increment a write vector by four frame positions. This will occur every time the FS pattern is in error until eventually the write vector is properly aligned with the incoming FS pattern.

Referring to FIGS. 4 through 7 taken collectively, when the signal FLAGB is sent by a digital span, the write vector (MRVCT0-MRVCT7), is set, it indicates that an S bit has been received and is available for frame checking. Signal FLAGB is constantly monitored by programming logic array (PLA) 761. This indicates that a particular digital span (T-carrier) is requesting a frame check operation. If no other digital span is requesting a frame check operation, PLA 761 and D type flip-flop 765 will produce a signal FRMCHK, which indicates that this particular digital span now has a pending frame check request.

Simultaneously, PLA 761 will generate a signal RSTFLGB which resets the frame check request FLAGB from the digital span. Additionally, PLA 761 will generate a strobe frame check signal STBFRMCHK through flip-flop 765 and NAND gate 769. Signal STBFRMCHK will cause hex flip-flop 605 to latch the following information: first, the three least significant bits of the write vector (MRVCT0-MRVCT2), which identify the particular digital span whose FLAGB signal will set; second, the odd/even frame bit (ODD/ENFR) which indicates whether the S bit is a TS bit or an FS bit; third, the BADT/FS signal, generated by data selector 322, which indicates whether the F/TS bit agrees with the expected value for that frame; and fourth, and a NOCHECK signal generated by data selector 322, which is true during frames 2 and 8. As mentioned above, the FS bits occurring during frames 2 and 8 are not checked.

Multiplexers 614 and 615 select either of two address sources for accessing memory 622. Memory 622 is a 256 by 4 bit RAM memory. During the frame checking operation, the contents of flip-flops 605 are selected to provide the address for access to memory 622. The memory contents of the address selected by flip-flops 605 contain the error history for the F/TS bit for the particular digital span being checked. The four bits read from the memory location are transmitted along with the BADT/FS signal to flip-flops 607. The outputs from flip-flops 607 are used as an address to access PROM memory 627. PROM memory 627 is an 32 by 8 bit memory device.

PROM memory 627 is arranged such that, if the address bits contain three or more ones, the ERROR output signal of PROM 627 will be true. The outputs of flip-flops 607 are also selected by selectors 616 and 617 and are written as data inputs to memory 622. In addition, the most recent value of BADT/FS bit is stored as one of the four bits of history data in memory 622. The four most recent values of the BADT/FS signal are written into memory 622 and will be available for the next succeeding frame check.

In response to the ERROR signal, PLA 761 will provide an 80 microsecond negative going pulse via NAND gate 773 on the FRCHKSTB lead, which will cause the circuitry (8 bit adder latches 501 and 502 and 8 bit data selector 504) to set an alarm indication for the particular digital span that has been determined to be in error.

If an error is detected while checking for the FS bit, PLA 761 operates via flip-flop 765 to produce the SRE-SYNC signal. As a result, flip-flop 716 will be set. While flip-flop 716 is set, the content of flip-flops 605 will remain stable, identifying which digital span requires resynchronization.

Next time the write vector for that particular digital span is accessed, four bit magnitude comparator 766 will generate a true signal on the SYNCMATCH lead. As a result, AND gate 726 will generate a RESYNC signal. When the BUFFEMTY signal and SYNCMATCH signal occur simultaneously, AND gate 704 generates a reset to flip-flop 716.

Synchronous 4-bit binary counter 710 and 4-bit magnitude comparator 722 form an 8 bit scanner, which constantly scans the outputs of the alarm bits via the FALMFOUND lead of data selector 504. When a frame alarm is detected, counter 710 is disabled from counting and its outputs identify the particular span which has the frame alarm. As a result, PLA 761 is informed that a reframing operation must be performed. In addition, signal FDTMATCH produced by comparator 722 will be true when the write vector of the particular digital span being reframed is accessed.

Figure 3:
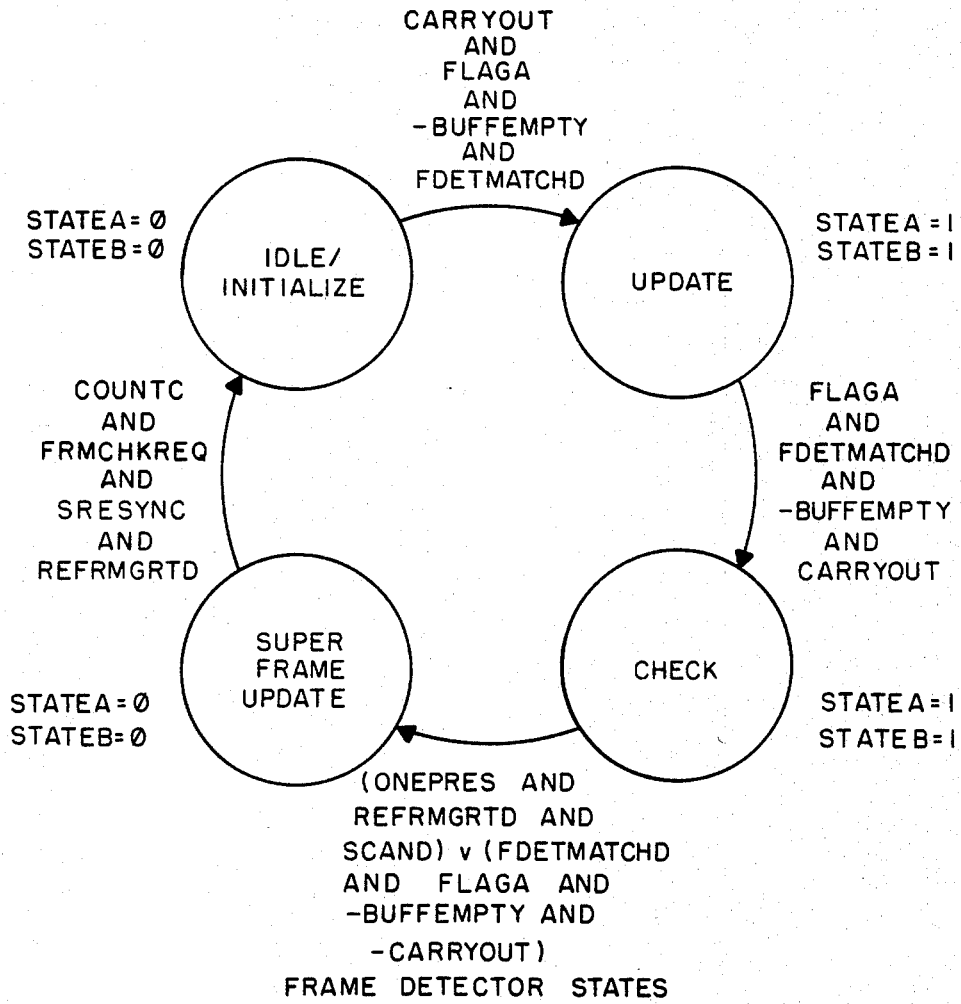
FIG. 3 is a state diagram of a frame detection and reframing circuit of the present invention.
Figure 4:
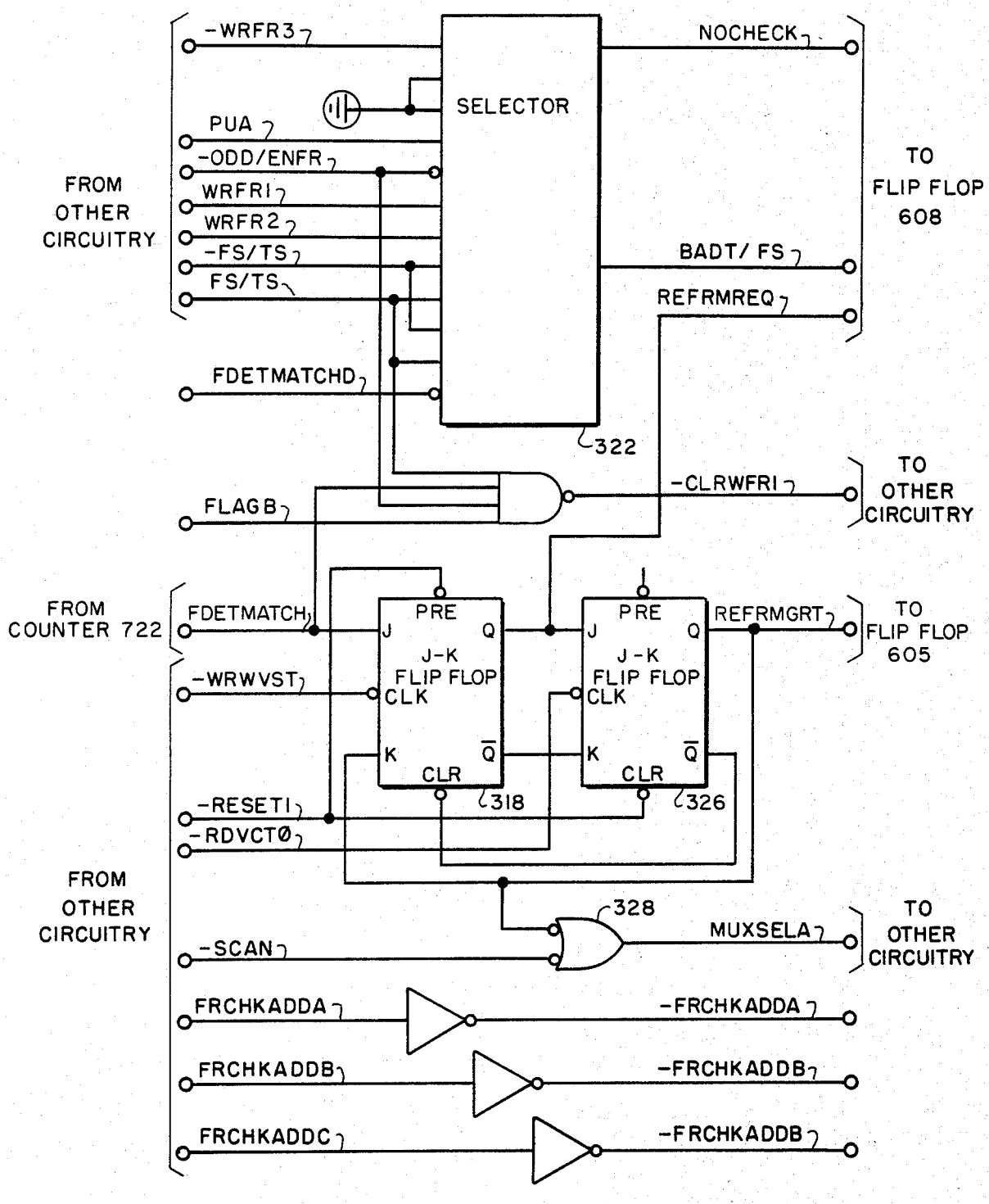
FIG. 4 is a schematic diagram of a portion of the digital span frame detection reframing circuitry.
Figure 5:
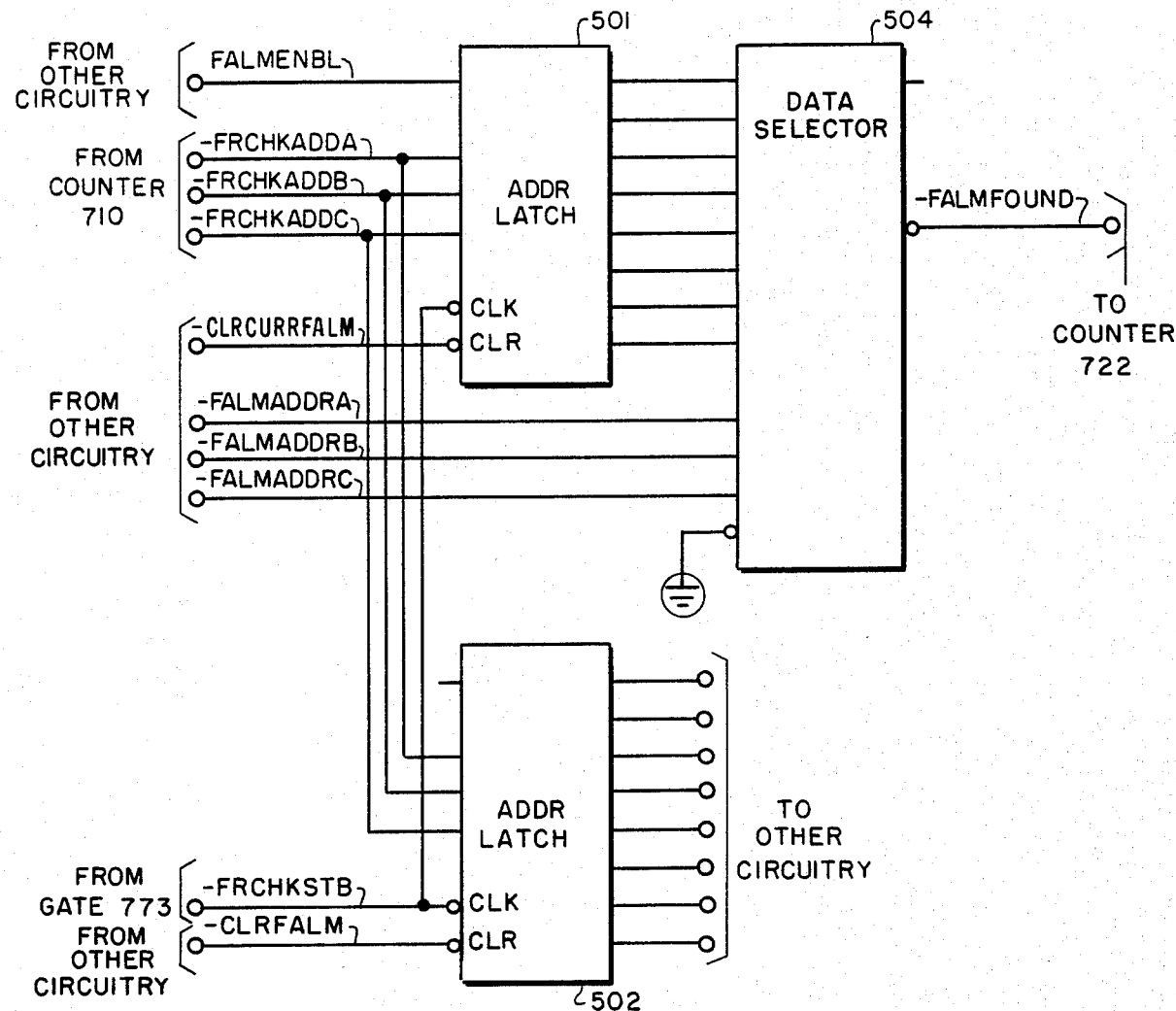
FIG. 5 is a schematic diagram of the alarm indication circuitry.
Figure 6A:
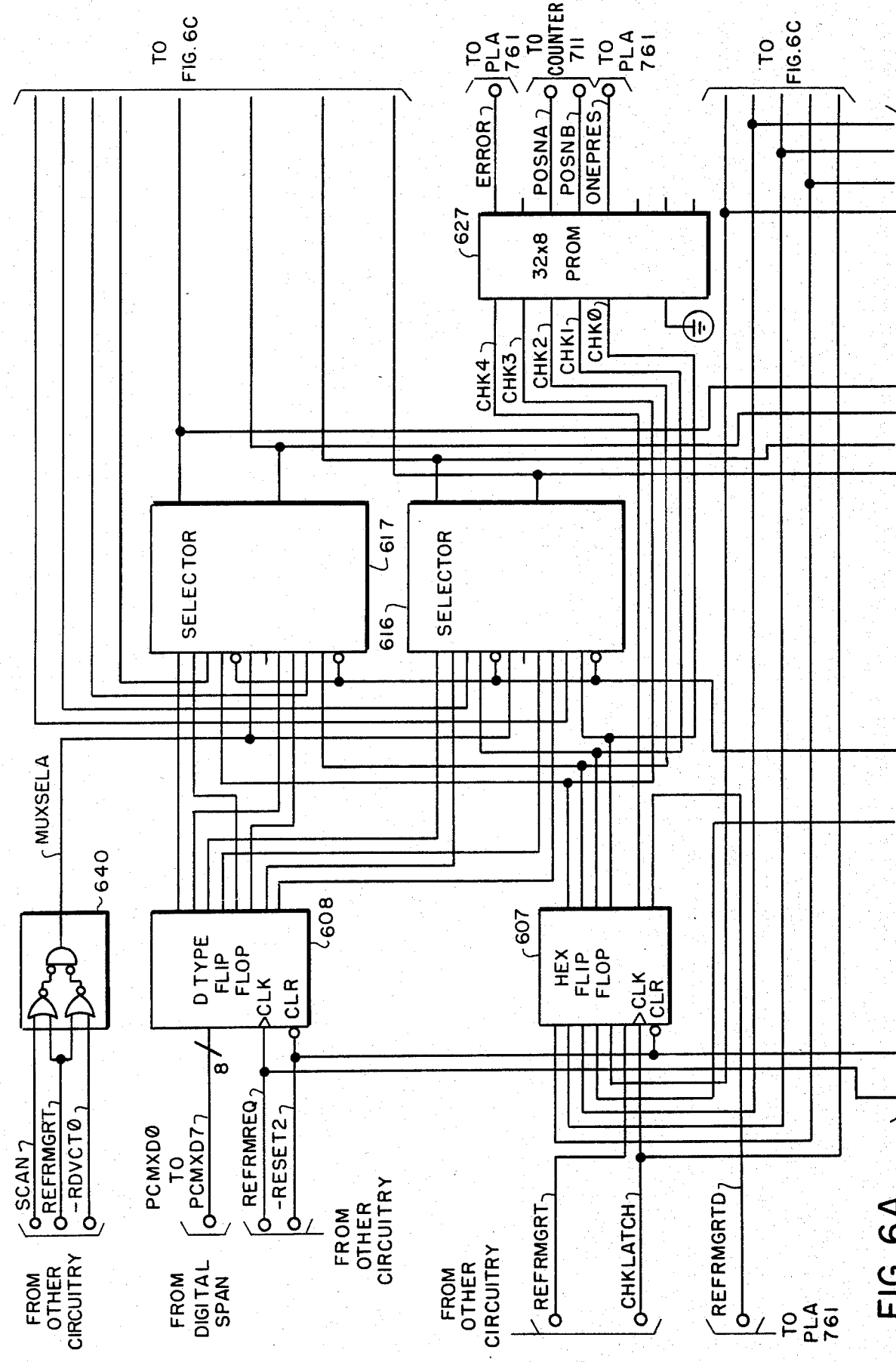
FIGS. 6A, 6B and 6C are schematic diagrams of a portion of the digital span frame detection and reframing circuitry.
Figure 6B:
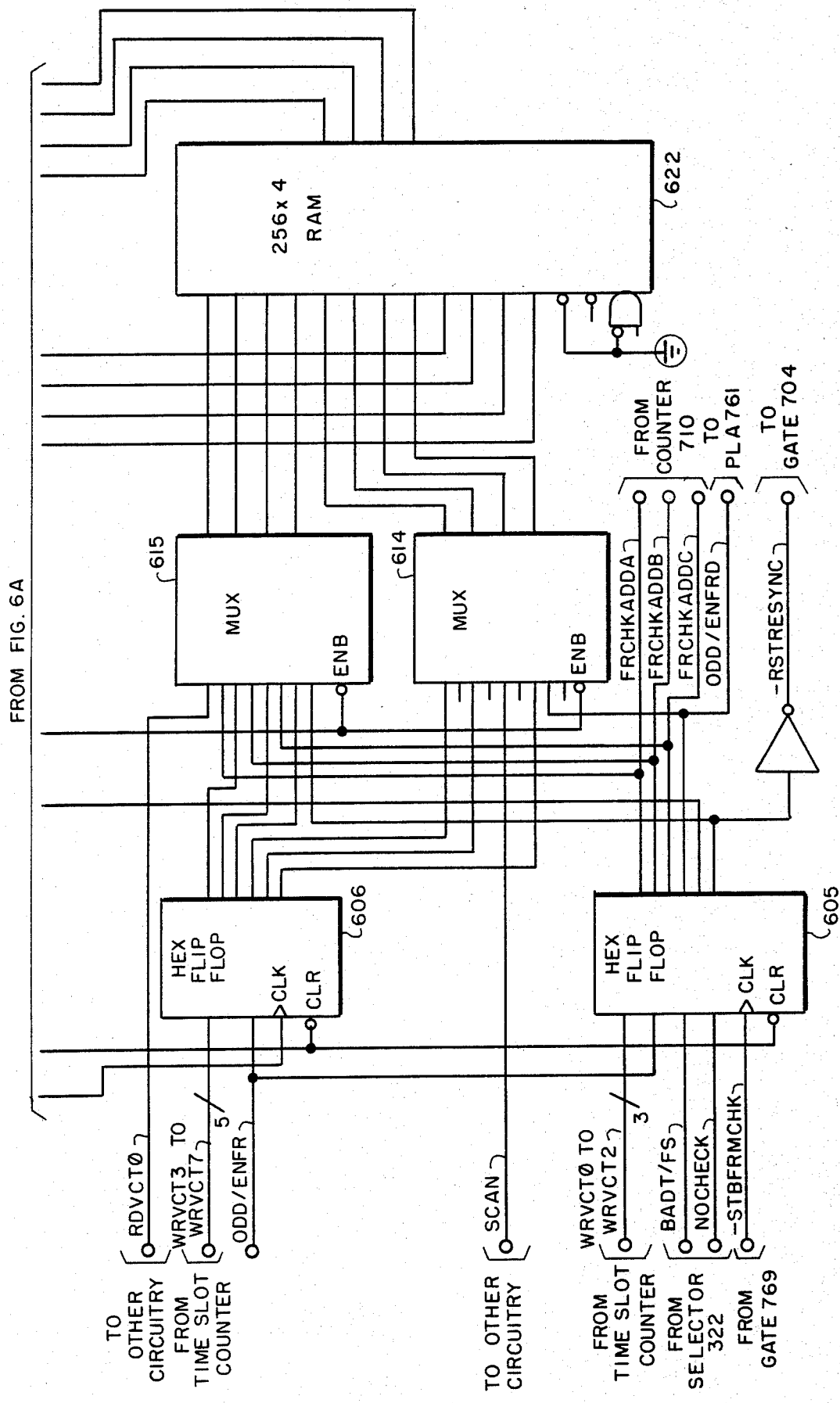
Figure 6C:
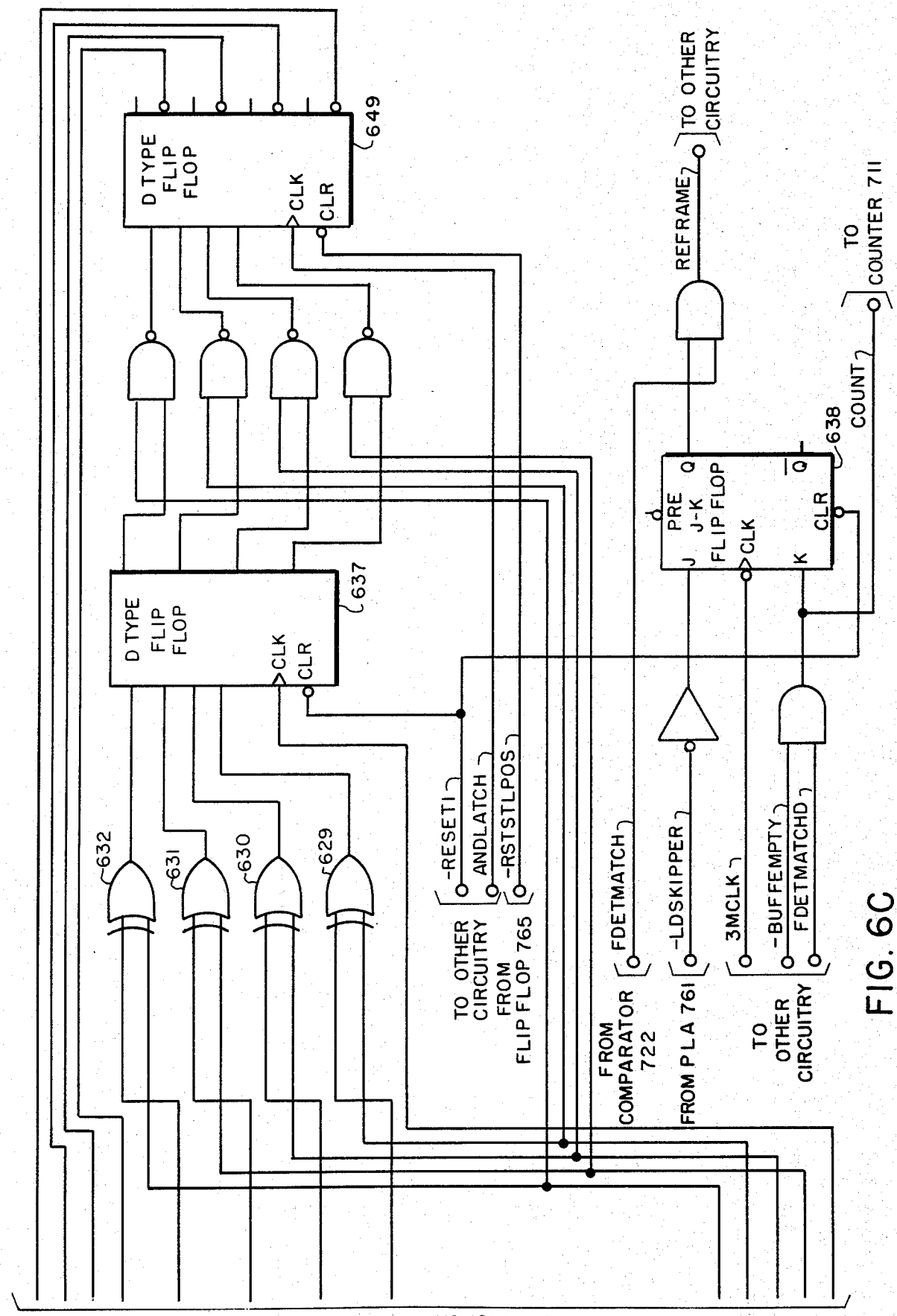
Figure 7A:
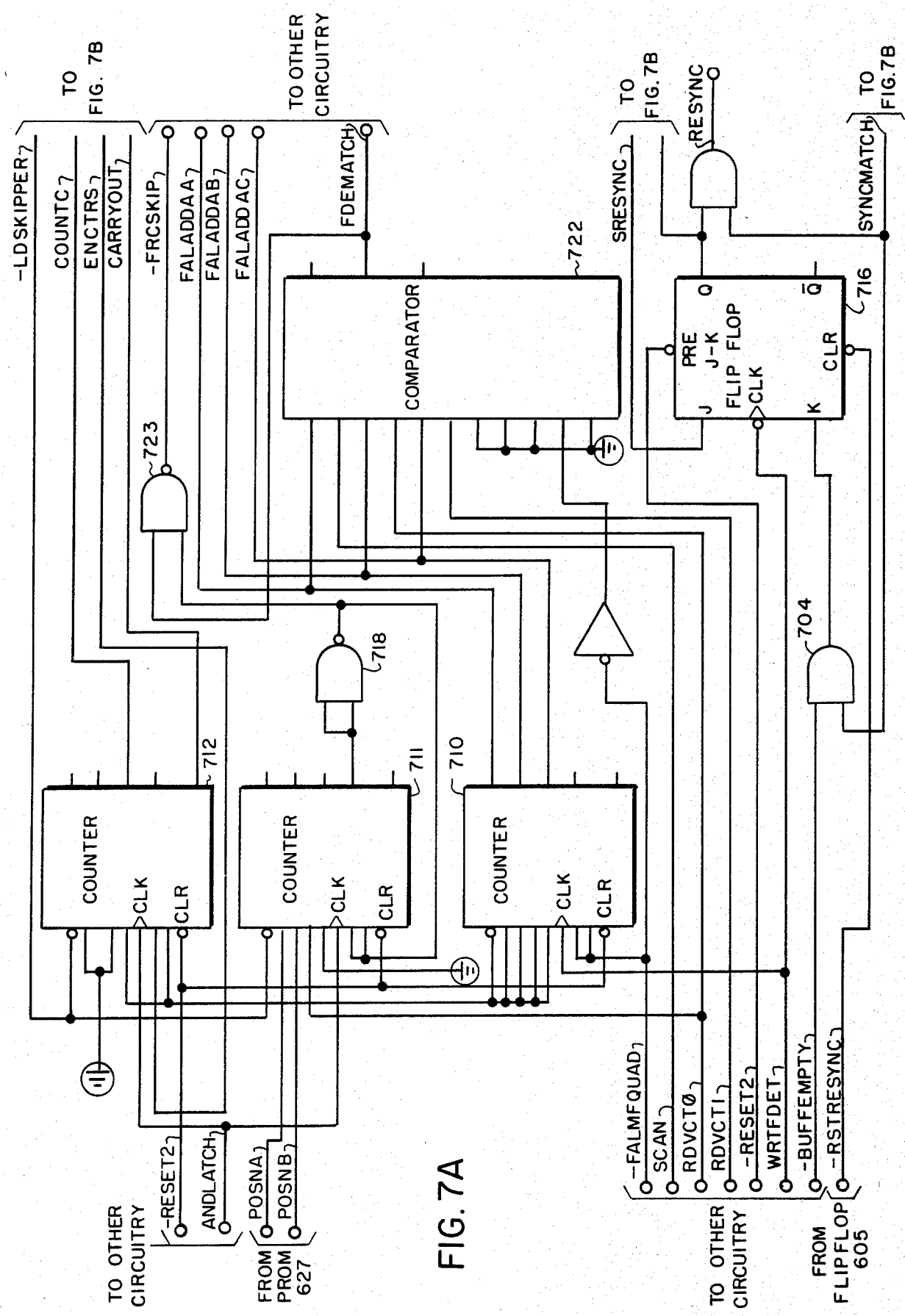

Comparator 712, PLA 761 and flip-flop 765 form a finite state machine, which controls the sequencing of the reframing procedure. The major reframing states are shown in the state diagram of FIG. 3.

Initially, all digital spans are in frame as reframing circuitry is in the idle/initialize state 1. When a frame alarm is detected, the reframing circuitry remains in this state for four frames of incoming data. During this time, data from the digital span in error will be written into memory 622. In addition, for every data bit that is written, a logic 1 will be written into a corresponding position, called the still possible bit position.

At the completion of this task, the reframing circuitry will enter the update state. During the update state, the bits received from the digital span undergoing reframing are compared with the bits received two frames previously. If they are the same, the corresponding still possible bit is reset; if they are different, the corresponding still possible bit is left unchanged. This process is repeated for 16 frames of data. Counter 712 is incremented once for each comparison so that its CRY output indicates the completion of the 16 frame interval period.

At this time, the reframe circuitry enters the check state. During this interval the still possible bits are examined. If a still possible bit is set, then the corresponding bit position is a possible framing bit position. When such a possible framing bit position is detected, flip-flop 638 and counter 711 are loaded with the proper data to ensure that reframing will take place. Then, the reframing circuitry enters the super frame update state.

During the super frame update state, the additional span should have proper terminal synchronization. At the completion of the super frame update state, a signal FRCHKSTB will be generated. As a result, the frame alarm will be reset via adder latches 501 and 502. The frame alarm scanner counters 710 and 722 will then resume scanning for another frame alarm on another digital span.

Whenever a particular digital span passes an eight bit PCM sample to the circuit via the PCMXD0 through PCMXD7 leads, flip-flop 318 is set indicating that PCM data is available for processing during the next time frame detector cycle. The contents of the PCM sample are latched into flip-flop 608 and value of the write vector is latched into flip-flops 606.

At the beginning of the next frame detector cycle, the REFRMREQ signal causes flip-flop 326 to be set, generating a reframe grant signal REFRMGRT. The reframe grant signal reserves the frame detector cycle for use in reframing operations only. Any pending frame check request will be deferred until the beginning of the next frame detector cycle.

The REFRMGRT signal causes selectors 614 and 615 to enable address information stored in flip-flops 606. During the first 324 nanoseconds, the contents of memory 622 are read out and "exclusive-ored" with PCMXD0-PCMXD3 via selectors 616 and 617. The output of the exclusive-or gates 629–632 is stored in flip-flop 637. During the next 324 nanosecond period, the four corresponding still possible bits are read from memory 622, "anded" with the contents of flip-flop 637 and stored in flip-flop 649, whose outputs are then gated by selectors 616 and 617 to be written back into memory 622. In this fashion, the still possible bits are updated. During the initialization state, signal RSTSTLPOS will constantly clear the contents of flip-flop 637 so that the data written back into the still possible bit positions will be all ones.

During the third and fourth intervals of 324 nanoseconds in the frame detector cycle, similar operations are performed with PCM data bits PCMXD4 through PCMXD7. During the second half of the frame detector cycle, the SCAN signal will be true, causing a different set of addresses to be accessed to memory 622.

Gates 328 and 640 generate the control signals from multiplexers 616 and 617. When the frame detector has completed the 16 frames of update operation, it enters the check state. During the check state, the frame detector cycles in the same manner in which it cycled during the update state; however, each time the still possible bits are read out of memory 622, they are used to address PROM memory 627. The PROM contents are arranged such that, if any of the still possible bits are set the one present ONEPRES signal will be true. This indicates that a framing bit position has been detected. The signals POSNA and POSNB indicate which of the four still possible bits was set (if more than one bit position is set, they will indicate the first bit position set). In response to the ONEPRES signal, the PLA 761 will set flip-flop 638 and will load this position information into counter 711.

Flip-flop 638 and its associated circuitry is arranged so that the next time the write vector is accessed for the particular digital span, the REFRAME signal will be true. Thereby, the write vector is forced to be set to channel 3. Counter 711, flip-flop 716, NAND gates 718 and 723 are arranged to insert a number of skip commands each time the particular digital span is accessed. The number of skips is determined by the bit position of the still possible bit that was detected. This position information is loaded into counter 711, which then inserts skip commands until it has counted up to a value of binary 1000, at which time the output of NAND gate 718 goes to a 0 and counter 711 stops counting.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system having a switching network, a plurality of digital spans being connected to said switching network and each said digital span asynchronously transmitting PCM data to said switching network, a digital span reframing circuit connected between each said digital span and said switching network for reframing and resynchronizing any of said plurality of digital spans in response to a reframe grant signal and a reframe status of each digital span, said digital span reframing circuit comprising:

said reframe status indicating at least one particular digital span requiring reframing and resynchronization;

memory means connected to each of said digital spans and being operated in response to said reframe grant signal and said reframe status of said particular digital span to cyclically store a predefined amount of said PCM data from said one particular digital span and to store still possible bits for each bit of said PCM data;

said memory means including:

first flip-flop means connected to said particular digital span;

multiplexer means connected to said first flip-flop means; and random access memory means connected to said multiplexer means;

means for comparing said still possible bits with received PCM data, said means for comparing connected to said memory means and being operated to generate a reset bit for each equality of said received PCM data with said still possible bits or alternatively to generate a set bit for each inequality of said received PCM data with said still possible bits;

said means for comparing including:

first gating means connected to said random access memory means for "exclusive-oring" said still possible bits with said received PCM data and being operated to produce a plurality of first signals;

second flip-flop means connected to said first gating means and operated to store said plurality of first signals;

second gating means connected to said second flip-flop means and being operated to "and" said plurality of first signals with said stored still possible bits of said memory means; and third flip-flop means connected between said second gating means and said multiplexer means;

said memory means being further operated to store said generated set and reset bits, of said means for comparing, as new still possible bits;

means for sequencing connected to said memory means, to said particular digital span and to said means for comparing, said means for sequencing being operated to cyclically operate said memory means and said means for comparing for a predetermined time interval;

said means for sequencing including:

a programming logic array;

first counter means connected to said programming logic array; and fourth flip-flop means connected to said programming logic array and to said third flip-flop means;

said means for sequencing and said memory means being cyclically connected to each said digital span of said plurality having said reframe status indicating reframing and resynchronization is required;

means for detecting connected to said memory means and to said means for sequencing, said means for detecting operated in response to said new still possible bits to generate a one present signal for a set still possible bit and to generate a plurality of signals representing the position of said set still possible bit within said PCM data; and means for generating connected to said means for detecting and to said means for sequencing, said means for generating being operated in response to said plurality of position signals of said means for detecting to produce a new write vector signal representing a pointer to the initial PCM data of a first frame for reframing and resynchronizing said particular digital span.

2. A digital span reframing circuit as claimed in claim 1, said means for detecting including programmable read only memory means connected to said first flip-flop means, to said programming logic array and to said means for generating.

3. A digital span reframing circuit as claimed in claim 2, said means for generating including fifth flip-flop means connected to said programming logic array and being operated to set said new write vector signal to a predetermined value.

4. A digital span reframing circuit as claimed in claim 3, said means for generating further including:

second counting means connected to said programmable read only memory means and to said programming logic array; and third gating means connected to said second counting means and being operated to adjust said new write vector for reframing and resynchronization.

5. A digital span reframing circuit as claimed in claim 4, said means for generating further including sixth flip-flop means connected to said programming logic array.

6. A digital span reframing circuit as claimed in claim 5, wherein there is further included latching means connected to said switching network and to said random access memory means for storing and transmitting a present value of said write vector signal.

7. A digital span reframing circuit as claimed in claim 6, said latching means further including:

seventh flip-flop means connected to said switching network and to said reframe grant signal; and selector means connected between said seventh flip-flop means and said random access memory means.

* * * * *